United States Patent [19]

Angeles

[11] Patent Number: 5,642,820

[45] Date of Patent: Jul. 1, 1997

[54] PORTABLE STORAGE SUPPORT STRUCTURE

[75] Inventor: James P. Angeles, Boulder, Colo.

[73] Assignee: LifeGear, Inc., Rockaway Township, N.J.

[21] Appl. No.: 544,931

[22] Filed: Oct. 18, 1995

[51] Int. Cl.$^6$ .................................................. A47F 5/00
[52] U.S. Cl. ........................... 211/103; 211/18; 248/159
[58] Field of Search ................................ 211/103, 90, 18, 211/22, 17, 87; 248/158, 159, 165; 108/108; 182/108

[56] References Cited

U.S. PATENT DOCUMENTS

| | | | |
|---|---|---|---|
| 3,920,240 | 11/1975 | Ross | 182/108 X |
| 4,813,550 | 3/1989 | Saeks | 211/22 X |
| 4,819,900 | 4/1989 | Funk | 108/108 X |
| 4,840,278 | 6/1989 | Gelinas | 211/20 X |
| 5,125,517 | 6/1992 | Martinell | 211/17 X |
| 5,477,789 | 12/1995 | VonGunten | 108/108 |

FOREIGN PATENT DOCUMENTS

| | | | |
|---|---|---|---|
| 645291 | 7/1962 | Canada | 211/90 |
| 29293 | 2/1958 | Finland | 108/108 |
| 1216060 | 11/1959 | France | 211/90 |

*Primary Examiner*—Robert W. Gibson, Jr.
*Attorney, Agent, or Firm*—David L. Davis

[57] ABSTRACT

Portable storage support structure adapted for resting on a floor and leaning against a wall includes elongated first and second members having a bend so as to together define a plane, and a support bar secured to the upper one of the members which lies within the plane and extends generally orthogonally to a major axis of the upper member. The length of the support bar is shorter than the projection of the lower member away from the upper member major axis so that the center of gravity remains between the distal end of the lower member and the wall. The upper end of the upper member and the distal end of the lower member frictionally engage the wall and the floor, respectively, so as to maintain the position of the support structure when a downwardly directed load is applied to the support bar.

6 Claims, 5 Drawing Sheets

5,642,820

PORTABLE STORAGE SUPPORT STRUCTURE

BACKGROUND OF THE INVENTION

This invention relates to storage support structure and, more particularly, to such storage support structure which is portable as well as being adaptable for use in a number of different ways.

It is often desirable to have support structure for use to store articles which takes up a minimum amount of space, which is readily movable, and which does not require permanent installation. Examples of such structure are bicycle racks and shelving systems. Thus, if a person lives in a small apartment, it may be desirable to provide a rack to hold a bicycle off the floor without requiring a permanent installation which damages the walls and/or ceiling of the apartment. Similarly, it may be desirable to also provide a shelving system which does not have to be permanently installed and which can be easily moved to a different location, as the need arises.

It is therefore a primary object of the present invention to provide portable storage support structure which satisfies the foregoing requirements.

SUMMARY OF THE INVENTION

The foregoing and additional objects are attained in accordance with the principles of this invention by providing portable storage support structure which is adapted to rest on a horizontal surface and lean against a vertical surface. The structure comprises an elongated first member having a major axis which is oriented generally vertical, the first member having an upper end and a lower end, and an elongated second member which is secured to the lower end of the first member and extends downwardly and away from the major axis of the first member so that the first and second members together define a first plane. The structure further includes a support bar and means for securing the support bar to the first member between its upper and lower ends, with the support bar lying within the first plane and extending generally orthogonally to the first member major axis. The lengths of the support bar and the second member are such that the projection of the distal end of the support bar on a second plane which is orthogonal to the first member major axis is closer to the first member major axis than is the projection on that second plane of the distal end of the second member. The structure also includes first friction means secured to the first member upper end for providing sliding frictional resistance between the first member upper end and the vertical surface and second friction means secured to the second member distal end for providing sliding frictional resistance between the second member distal end and the horizontal surface. In this manner, the support structure rests on the floor and leans against the wall and any weight supported by the support bar tends to rotate the support structure about the second member distal end toward the wall and increase the frictional resistance between the first and second friction means and the vertical and horizontal surfaces, respectively, to maintain the position of the support structure.

In accordance with an aspect of this invention, a portable shelving system is obtained by providing a pair of portable support structures each constructed as set forth above and also providing a shelf resting on and extending between the support bars of the pair of structures.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
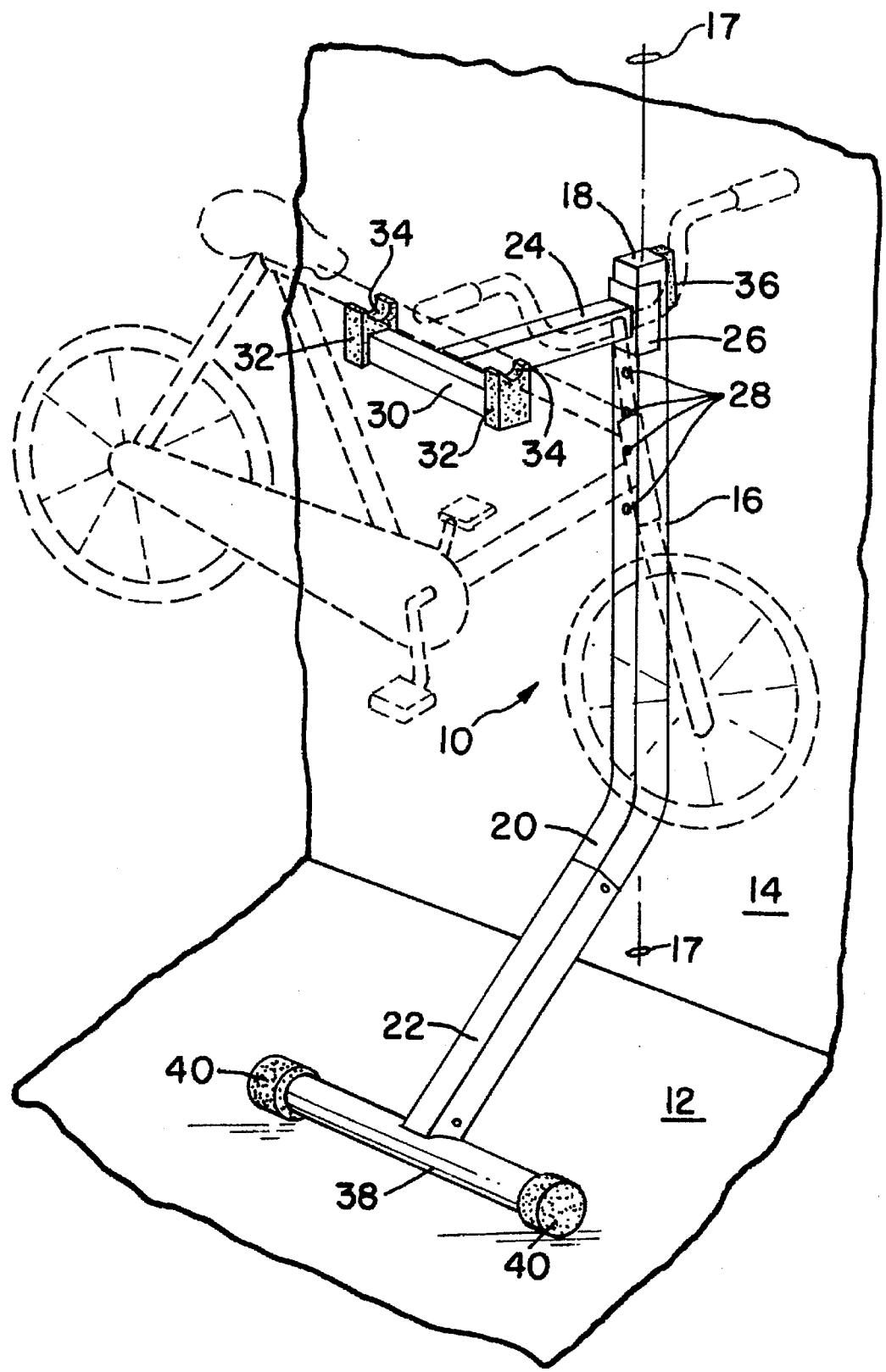
FIG. 1 is a perspective view of portable storage support structure according to the present invention adapted to be used as a bicycle rack.

Referring now to the drawings, FIG. 1 illustrates support structure, designated generally by the reference numeral 10, which is constructed according to this invention and is adapted for supporting a bicycle (shown in phantom) in a suspended state above the floor 12. In addition to resting on the floor, or horizontal surface, 12, the support structure 10 leans against the wall, or vertical surface, 14.

As shown, the support structure 10 includes an elongated first member 16 having a major axis 17 which is oriented generally vertically, and having an upper end 18 and a lower end 20. The structure 10 further includes an elongated second member 22 which is secured to the lower end 20 of the first member 16 and extends downwardly and away from the first member major axis 17 so that the first and second members 16, 22 together define a first plane. This first plane is the plane of the paper in FIG. 3.

As illustrated, the first and second members 16, 22 are formed of square tubing. It is understood that other material, for example round tubing, may be utilized as well. Further, the first member 16 is illustrated as having a relatively sharp bend away from the major axis 17 just above the lower end 20. Instead of a sharp bend, a continuous curve may be utilized. Still further, this sharp bend is shown as being part of the first member 16, with the second member 22 being straight. It is understood that the bend, or part of a substitute curve, could be incorporated in the second member 22 so that the first member 16 is substantially straight. Still further, the first and second members 16, 22 are shown as being separate elements, secured to each other in any desired manner, such as by one being telescopically received in the other and with fastening members extending through aligned holes in the members 16, 22. It is understood that in accordance with this invention, the first and second members 16, 22 may be formed together as a unitary element.

The support structure 10 further includes a support bar 24 which is secured to the first member 16 between the upper and lower ends 18, 20. Such securement is illustratively effected by a bracket 26 which is welded to the end of the support bar 24 and which straddles the first member 16. A pin (not shown) coaxial with the support bar 24 is inserted through a selected one of the openings 28 which extend along the first member 16, with aligned openings (not shown) on the other side of the first member 16, so that the pin can have a threaded end exposed behind the first member 16 and to which a nut can be attached. Thus, the height of the support bar 24 can be adjusted. In any event, the support bar 24 lies within the first plane defined by the first and second members 16, 22 and extends generally orthogonally to the major axis 17.

The distal end of the support bar 24 is provided with particular structure adapted for the desired use of the support structure 10. Illustratively, if the support structure 10 is to be utilized as a bicycle rack, as shown in FIG. 1, a holder bar 30 is secured at a central location, illustratively by welding, to the support bar 24 distal end. The holder bar 30 has two ends and extends orthogonally to the plane defined by the first and second members 16, 22. At each end of the holder bar 30, there is mounted a respective holding member 32. If the structure 10 is used as a bicycle rack, each holding member 32 includes a body with its upper surface formed with an arcuate groove 34 of sufficient size to receive a bicycle tubular frame member. The grooves 34 of the pair of bodies 32 are generally coaxial when the bodies 32 are secured to the holder bar 30 ends.

So that the support structure 10 can rest on the floor 12 and lean against the wall 14 without moving relative thereto, secured to the upper end 18 of the first member 16 is a friction pad 36 for providing sliding frictional resistance between the upper end 18 and the wall 14. The friction pad 36, which illustratively is formed of an elastomeric material, may be secured to the first member 16 in any desired manner, such as, for example, by adhesive or by a projection extending through an opening. In any event, as best shown in FIG. 3, the outer surface of the friction pad 36 is slanted with respect to the major axis 17 so that when the structure 10 leans against the wall 14, maximum surface contact between the pad 36 and the wall 14 is maintained.

For providing frictional resistance against the floor 12, a base bar 38 is secured at a central location to the distal end of the second member 22. The base bar 38 has two ends and extends orthogonally to the plane defined by the first and second members 16, 22. On each end of the base bar 38, there is mounted a friction providing cup 40, which may be of suitable elastomeric material. The use of the base bar 38 provides a degree of stability to the support structure 10 when it rests on the floor 12 and leans against the wall 14.

Figure 3:
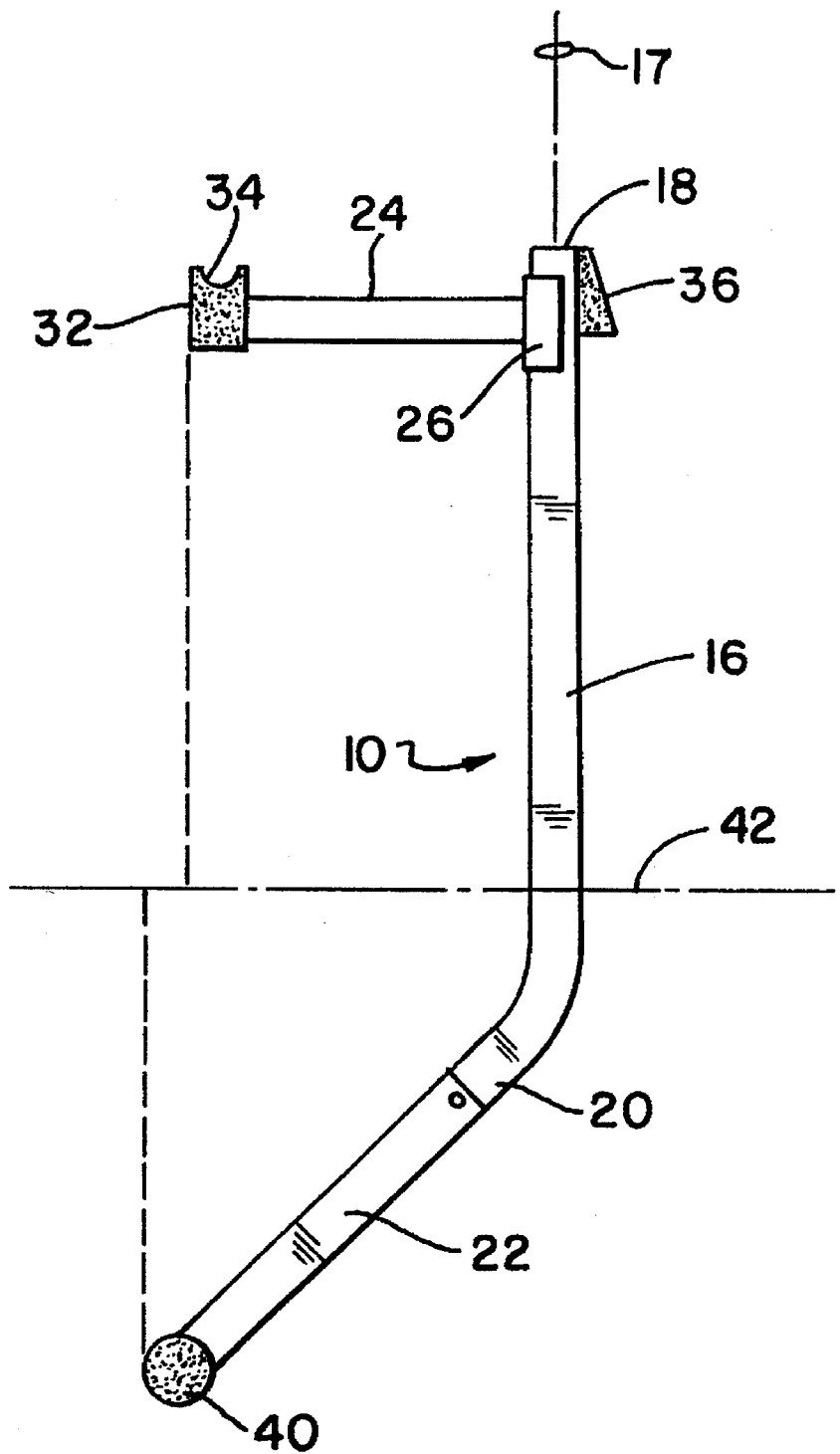
FIG. 3 is a side view of the structure shown in FIG. 1 illustrating the geometry of such structure.

FIG. 3 illustrates the geometric relationships among the parts of the support structure 10 which enables it to function properly. As previously described, the first plane defined by the first and second members 16, 22 is the plane of the paper in FIG. 3. A second plane orthogonal to the major axis 17 of the first member 16 is shown by the dot-dash line 42. To provide stability, the projection of the distal end of the support bar 24 on the second plane 42 is closer to the major axis 17 than is the projection on the plane 42 of the distal end of the second member 22. Thus, the center of gravity of the support structure 10 together with whatever is supported by the support bar 24 is always between the base bar 38 and the wall 14. This insures that the support structure 10 does not topple away from the wall 14 and further insures that the weight of the supported article increases the frictional resistance between the friction pad 36 and the wall 14 and between the friction cups 40 and the floor 12.

Figure 2:
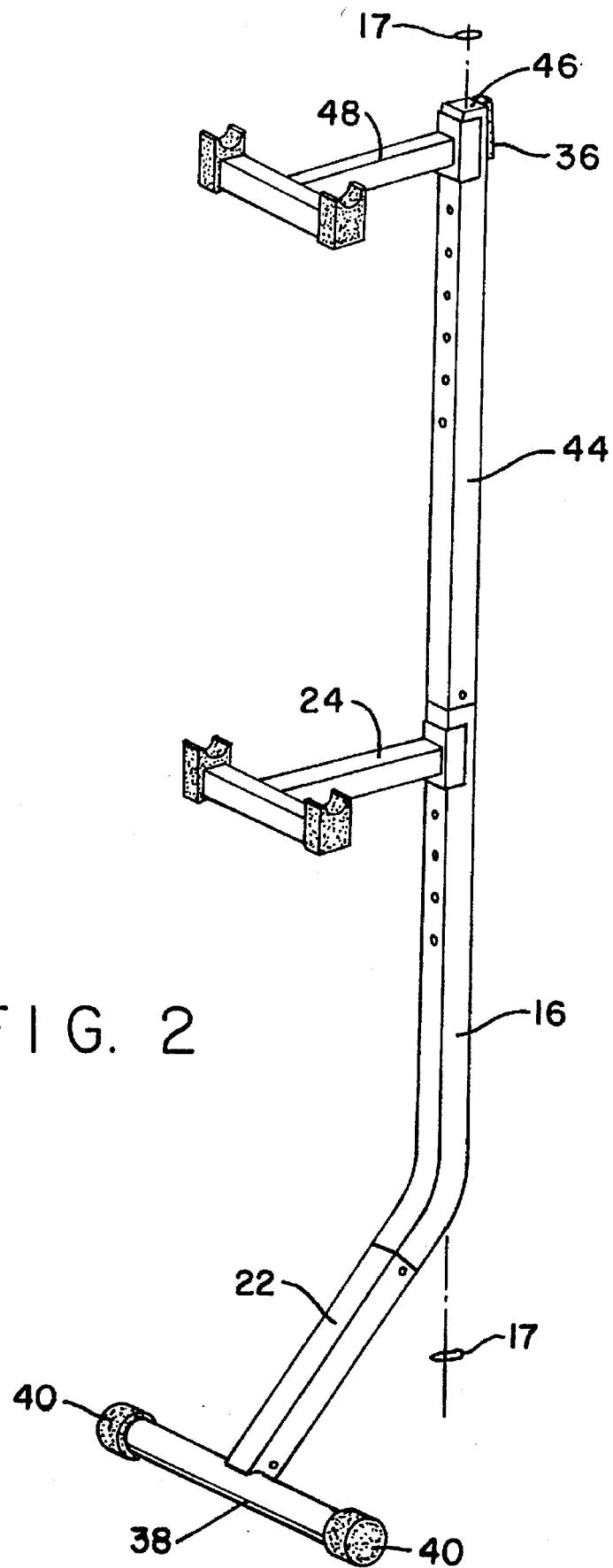
FIG. 2 illustrates the modular nature of the inventive structure by showing an extension to the first member shown in FIG. 1, whereby a pair of bicycles can be supported.

FIG. 2 illustrates the modular nature of the inventive portable storage support structure. As shown in FIG. 2, a second support level is provided for the support structure. This is effected by providing a third member 44 which is telescopically received within the upper end 18 of the first member 16 and is secured thereto in a conventional manner by a suitable fastener so as to function as a generally linear extension on the first member 16 along the major axis 17. Note that the friction pad 36 has been moved from the upper end 18 of the first member 16 to the upper end 46 of the third member 44. In addition, a second support bar 48, illustratively identical to the support bar 24, is secured to the third member 44. The second support bar 48 lies within the first plane and extends generally orthogonally to the major axis 17. Further, the projection of the distal end of the second support bar 48 on the second plane 42 is closer to the major axis 17 than is the projection on the plane 42 of the distal end of the second member 22. This preserves the relationship of the center of gravity with respect to the base bar 38 and the wall 14, as previously described when referring to FIG. 3. Thus, the structure shown in FIG. 2 can support a pair of bicycles, one on each of the support bars 24, 48.

Figure 4:
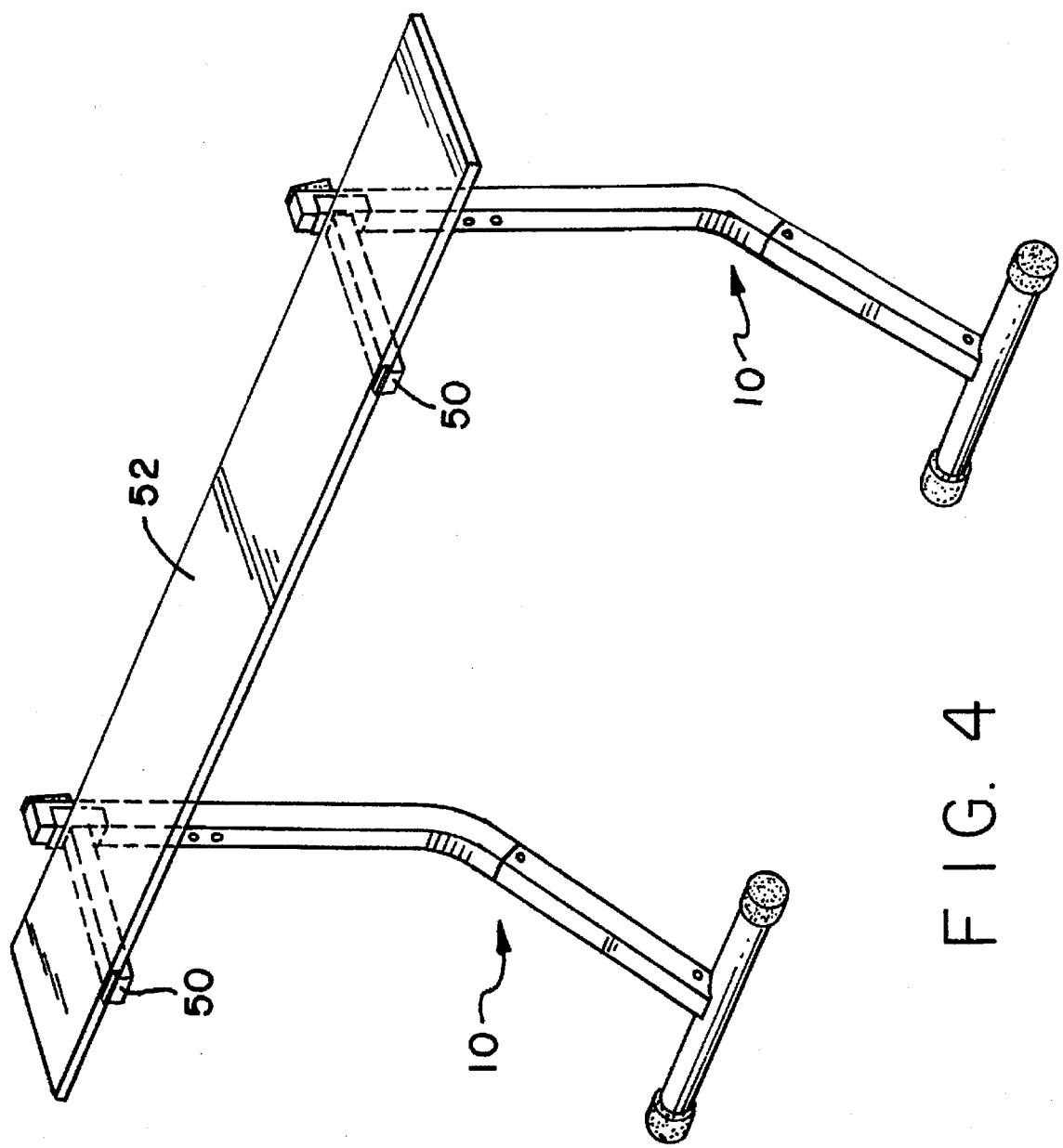
FIG. 4 shows a portable shelving system constructed according to the present invention.

FIG. 4 illustrates how two sets of support structure 10 can be utilized to provide a shelving system. Thus, instead of the bicycle support bar 24, one or more shelf support bars 50 can be utilized on each of at least two support structures 10 which are arranged side by side resting on the floor 12 and leaning against the wall 14. The shelf support bars 50 must satisfy the geometry illustrated in FIG. 3, in order to maintain the stability of the structure. Then, a shelf 52 is provided which rests on and extends between the shelf support bars 50 of the pair of side-by-side support structures 10. FIG. 4 illustrates a single height support structure 10. It is understood that the height of the structure 10 can be increased, as shown in FIG. 2, with additional shelf support bars 50 being provided at spaced intervals along the height of the structures 10. In addition, the support structure as disclosed lends itself to variation with a combination of bicycle holding support bars 24 and shelf support bars 50.

Figure 5:
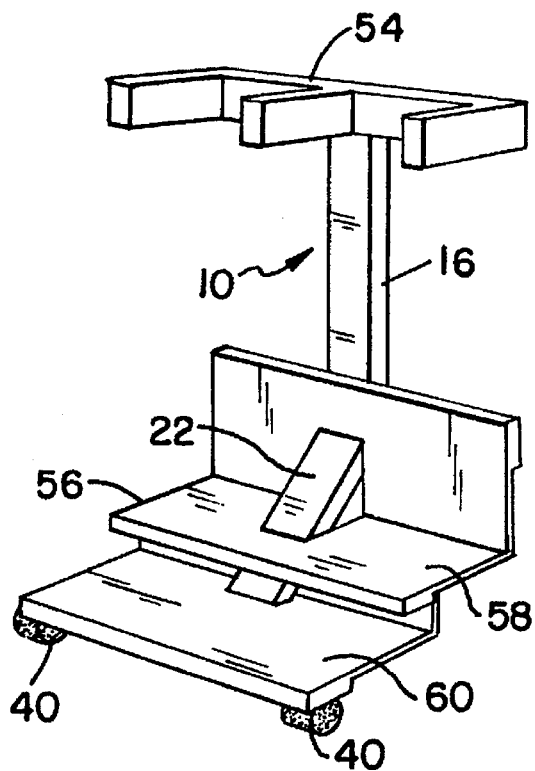
FIG. 5 illustrates how the structure according to this invention can be adapted for storing golfing equipment.

FIG. 5 illustrates how the inventive support structure 10 can be adapted for storing golfing equipment. Thus, in place of the bicycle support bar 24, there is provided a golf bag holder 54 which provides a pair of open "compartments" for holding a pair of golf bags. In addition, a two-tier shelf unit 56 is fitted over the lower, second, member 22 of the structure 10. The upper shelf 58 supports the bottoms of the golf bags and the lower shelf 60 can hold golf shoes.

Figure 6:
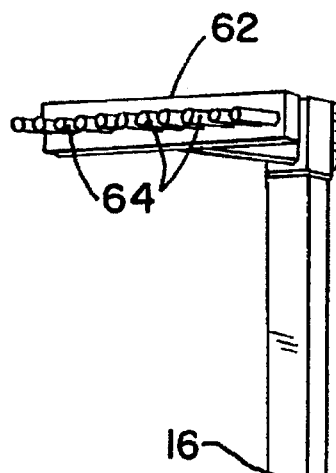
FIG. 6 illustrates how the structure according to this invention can be adapted for storing ski equipment.
Figure 6:
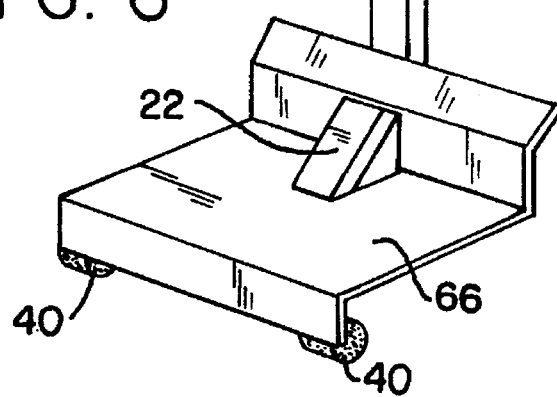

FIG. 6 illustrates how the inventive support structure 10 can be adapted for storing ski equipment. Thus, in place of the bicycle support bar 24, there is provided a ski holder 62 which includes a plurality of spaced parallel pins 64 which provide a plurality of open "compartments" for holding a plurality of skis in a generally vertical orientation. In addition, a shelf unit 66 is fitted over the lower, second, member 22 of the structure 10. The shelf unit 66 supports the bottoms of the skis and can also hold ski boots.

Accordingly, there has been disclosed improved portable storage support structure. It is understood that the above-described embodiments are merely illustrative of the application of the principles of this invention. Numerous other embodiments may be devised by those skilled in the art without departing from the spirit and scope of this invention, as defined by the appended claims.

What is claimed is:

1. Portable storage support structure adapted for resting on a horizontal surface and leaning against a vertical surface, comprising:

an elongated first member having a major axis oriented generally vertically, said first member having an upper end and a lower end;

an elongated second member secured to the lower end of said first member and extending downwardly and away from said major axis of said first member so that said first and second members together define a first plane;

a support bar;

means for securing said support bar to said first member between said first member upper and lower ends, with said support bar lying within said first plane and extending generally orthogonally to said first member major axis, and wherein the projection of the distal end of said support bar on a second plane which is orthogonal to said first member major axis is closer to said first member major axis than is the projection on said second plane of the distal end of said second member;

first friction means secured to said first member upper end for providing sliding frictional resistance between said first member upper end and said vertical surface;

second friction means secured to said second member distal end for providing sliding frictional resistance between said second member distal end and said horizontal surface;

a holder bar secured at a central location to said support bar distal end, said holder bar having two ends, and said holder bar extending orthogonally to said first plane; and a pair of holding members each secured to a respective one of said holder bar ends:

whereby an article to be held by said structure is disposed on said pair of holding members so that the weight of said article increases the frictional resistance between said first and second friction means and said vertical and horizontal surfaces, respectively, to maintain the position of said structure.

2. The structure according to claim 1 wherein said second friction means includes:

a base bar secured at a central location to said second member distal end, said base bar having two ends, and said base bar extending orthogonally to said first plane; and a pair of friction providing members each secured to a respective one of said base bar ends.

3. The structure according to claim 1 wherein said first member is a hollow tubular member and further including:

an elongated hollow tubular third member having a lower end telescopically received within said first member upper end so that said third member functions as a generally linear extension of said first member along said first member major axis; and wherein said first friction means is secured to the upper end of said third member instead of to the first member upper end.

4. The structure according to claim 3 further including:

a second support bar;

means for securing said second support bar to said third member between its upper and lower ends, with said second support bar lying within said first plane and extending generally orthogonally to said major axis, and wherein the projection of the distal end of said second support bar on said second plane is closer to said major axis than is the projection on said second plane of the distal end of said second member.

5. The structure according to claim 1 wherein each of said holding members includes a body with its upper surface formed with an arcuate groove of sufficient size to receive a bicycle tubular frame member, the grooves of said pair of bodies being generally coaxial when said bodies are secured to said holder bar ends.

6. The structure according to claim 1 wherein said means for securing said support bar includes means for adjusting the position of said support bar along said first member.

* * * * *